United States Patent [19]

Ohi

[11] Patent Number: 5,220,227
[45] Date of Patent: Jun. 15, 1993

[54] ROTOR MAGNET OF MOTOR AND HAVING IMPROVED MAGNETIZING PATTERN AND METHOD OF MAGNETIZING THE SAME

[75] Inventor: Shinichi Ohi, Konan, Japan

[73] Assignee: Zexel Corporation, Tokyo, Japan

[21] Appl. No.: 738,907

[22] Filed: Aug. 1, 1991

[30] Foreign Application Priority Data

Aug. 7, 1990 [JP] Japan ................................ 2-83408

[51] Int. Cl.$^5$ .......................................... H02K 21/12
[52] U.S. Cl. ...................................... 310/156; 310/51;
310/67 R; 310/114; 310/177
[58] Field of Search .............. 310/178, 114, 156, 269,
310/67 R, 122, 177, 133, 180, 51, 254, 46;
318/138, 254; 29/607

[56] References Cited

U.S. PATENT DOCUMENTS

| | | | |
|---|---|---|---|
| 3,873,897 | 3/1975 | Muller | 310/172 |
| 4,030,005 | 6/1977 | Doemen | 318/138 |
| 4,097,754 | 6/1978 | Farr . | |
| 4,371,817 | 2/1983 | Muller | 318/138 |
| 4,417,186 | 11/1983 | Hirose | 310/156 |
| 4,574,211 | 3/1986 | Muller | 310/67 R |
| 4,717,850 | 1/1988 | Muller | 310/156 |
| 4,730,136 | 3/1988 | Muller | 310/67 R |
| 4,998,032 | 9/1991 | Burgbacher | 310/51 |

FOREIGN PATENT DOCUMENTS

| | | |
|---|---|---|
| 0169569 | 7/1985 | European Pat. Off. . |
| 61-114979 | 7/1986 | Japan . |
| 62-152695 | 9/1987 | Japan . |
| 2005482 | 4/1979 | United Kingdom . |

OTHER PUBLICATIONS

JP 61-177 148 A Patent Abstracts of Japan, Sec. E. vol. 10, Oct. 24, 1986, Nr. 386 (E-467).

Primary Examiner—R. Skudy
Attorney, Agent, or Firm—Wenderoth, Lind & Ponack

[57] ABSTRACT

A rotor magnet of the type including a plurality of circumferentially arranged magnets of alternately opposite polarities, wherein each of the magnets has a magnetizing pattern such that the magnetic force is minimum at predetermined portions near opposite ends of the magnet and gradually increases from the predetermined portions toward the center of the magnet and also from the predetermined portions toward the opposite ends of the magnet. With this magnetizing pattern, the rotor magnet has a substantially sinusoidal waveform-like magnetic flux density distribution pattern when the motor is rotating. As a consequence, the magnetic polarity changes smoothly and the motor can, therefore, operate at a low operation noise.

2 Claims, 3 Drawing Sheets

STATIC MAGNETIC FLUX DISTRIBUTION PATTERN

DYNAMIC MAGNETIC FLUX DISTRBUTION PATTERN

ROTOR MAGNET OF MOTOR AND HAVING IMPROVED MAGNETIZING PATTERN AND METHOD OF MAGNETIZING THE SAME

BACKGROUND OF THE INVENTION

1. Field of the Invention

The present invention relates generally to a motor particularly suitable for use in an automotive air-conditioner for driving a blower, and more particularly to a magnetizing pattern of a rotor magnet of the motor and a method of magnetizing the rotor magnet.

2. Description of the Prior Art

A conventional rotor magnet known from Japanese Utility Model Laid-open Publication No. 61-114979 has a magnetizing pattern composed of a rectangular waveform-like magnetic flux density distribution pattern, such as shown in FIG. 5(a), which is formed by magnetizing the adjacent magnets to have a constant magnetic force. According to another known rotor magnet disclosed in Japanese Utility Model Laid-open Publication No. 62-152695, the magnets are magnetized so as to form a substantially sinusoidal (but not continuous) waveform-like magnetic flux distribution pattern, such as shown in FIG. 6(a), in which each magnet has a maximum magnetic force at the center and gradually decreases toward the opposite ends thereof.

When using the rotor magnet having the rectangular waveform-like magnetic flux density distribution pattern, the magnetic polarity changes abruptly as shown in FIG. 5(b) and generates objectionable vibration which causes resonance vibration of the motor and a case containing the motor, thereby enhancing the operation noise of the motor.

On the other hand, the rotor magnet having the substantially sinusoidal waveform-like magnetic flux density distribution pattern produces a distortion each time the magnetic polarity changes during rotation of the motor, as shown in FIG. 6(b). The operation noise of the motor cannot be further reduced.

SUMMARY OF THE INVENTION

With the foregoing difficulties of the prior art in view, it is an object of the present invention to provide a rotor magnet having an improved magnetizing pattern which is capable of eliminating a distortion of the magnetic flux density distribution which would otherwise occur at the change of magnetic polarity when the motor is rotating, thereby lowering the operation noise of the motor.

According to a first aspect of the present invention, there is provided a motor which comprises: a rotor having a rotor magnet and being fixedly mounted on a rotating shaft; a stator confronting the rotor magnet with a predetermined air-gap defined therebetween; and a means for exciting an exciting coil of the stator; wherein the rotor magnet is composed of a plurality of circumferentially arranged magnets of alternate opposite polarities, each of the magnets having a magnetic force distributed in a magnetizing pattern such that the magnetic force is minimum at predetermined portions near opposite ends of the magnet and increases gradually from the predetermined portions toward the center of the magnet and also from the predetermined portions toward the opposite ends of the magnet.

Since the magnetic force is minimum at the portions near the opposite ends of each magnet, the magnetic flux density distribution pattern formed when the motor is rotating has a continuous, distortion-free sinusoidal waveform-like pattern. This sinusoidal waveform-like pattern insures a smooth change of the magnetic polarity and a reduction of the operation noise of the motor.

According to a second aspect of the present invention, there is provided a method of forming the magnetizing pattern of each magnet of the rotor magnet defined in claim 1, comprising the steps of: providing a ferromagnetic material along a magnetic power source, the ferromagnetic material constituting each magnet of the rotor magnet; providing a metal body on the side of the ferromagnetic material which is opposite to the magnetic power source, the metal body having a first portion confronting the center of the ferromagnetic material and disposed closest to the ferromagnetic material, a pair of second portions contiguous to the first portion and confronting predetermined portions of the ferromagnetic material located near opposite ends of the ferromagnetic material, the second portions being spaced farther from the ferromagnetic material than the first portion, and a pair of third portions contiguous to the second portions and confronting the opposite ends of the ferromagnetic material, the third portions disposed close to the ferromagnetic material; and energizing the magnetic power source, thereby magnetizing the ferromagnetic material between the magnetic power source and the metal body.

The above and other objects, features and advantages of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION

The present invention will be described hereinbelow in greater detail with reference to certain preferred embodiments shown in the accompanying drawings.

Figure 1:
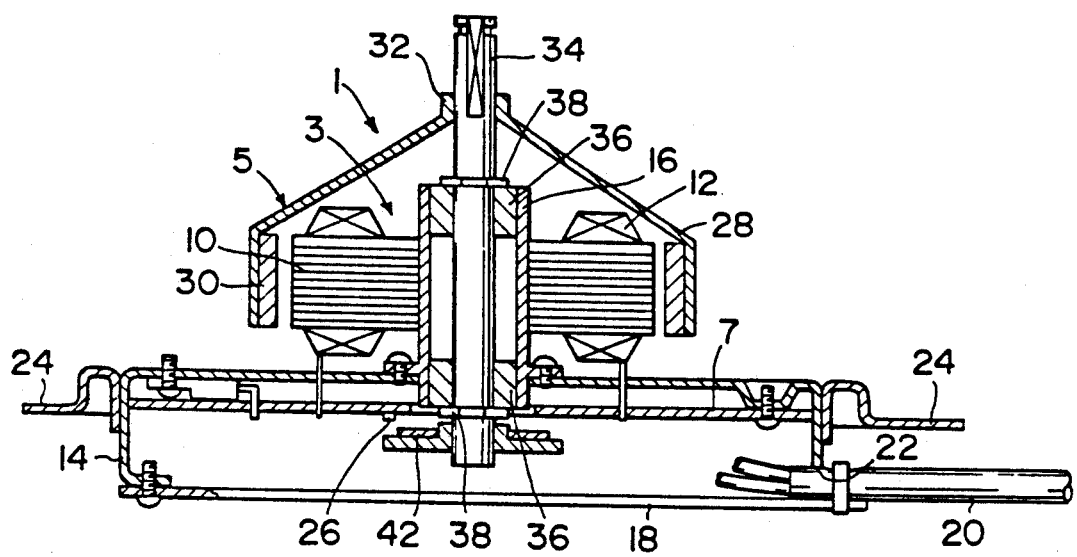
FIG. 1 is a schematic vertical cross-sectional view of a motor having a rotor magnet according to the present invention.
Figure 2:
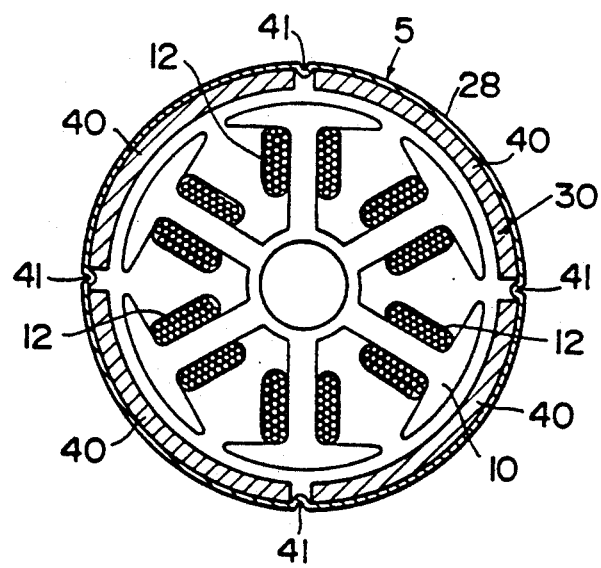
FIG. 2 is a horizontal cross-sectional view showing the rotor magnet and a stator of the motor.

As shown in FIGS. 1 and 2, a motor 1 embodying the present invention is a direct current (DC) brushless motor for driving a blower, for example, of an automotive air-conditioner. The motor 1 includes a centrally disposed armature (stator) 3, a rotor 5 disposed above the armature 3 so as to enclose the armature 3, and a printed circuit board 7 disposed below the armature 3.

The armature 3 is composed of a core 10 made of a number of silicon steel plates laminated together, and an exciting coil 12 disposed in slots (six in the illustrated embodiment) in the core 10 and wound around the core 10 so as to form multi-phase windings, such as three-phase windings. The armature 3 is firmly fitted around a central tube or cylinder 16 secured to a housing or case 14 of the printed circuit board 7. The armature 3 produces a rotating magnetic field acting on the rotor 5 when windings of the respective phases of the exciting coil 12 are excited.

The case 14 is downwardly open and is screwed to a bottom cover 18 mounted at the peripheral edge of the downward opening thereof. The printed circuit board 7 is disposed within the case 14 and screwed to the case 14. The case 14 has a through-hole 22 formed in the side wall for the passage therethrough of a cable 20 which connects the printed circuit board 7 and a power supply, not shown. Three mounting brackets 24 circumferentially spaced at equal intervals are joined with the side wall of the case 14 for attaching the motor 1 to a casing of the blower, not shown.

The printed circuit board 7 includes an exciting circuit (not shown) for magnetizing the armature 3. In the illustrated embodiment, a predetermined number of Hall-effect elements 26 are disposed on the printed circuit board 7. The Hall-effect elements 26 detect the position of magnetic poles of a permanent magnets 42 fixedly mounted on a rotating shaft 34 which will be described later. Based on the detected signals issued from the Hall-effect elements 26, the respective windings of the exciting coil 12 of the armature 3 are alternately excited while keeping a predetermined phase difference.

The rotor 5 is composed of a yoke 28 of a magnetic material, and a rotor magnet 30 comprised of a plurality of circumferentially arranged permanent magnets 40. The yoke 28 has a central boss 32 into which the rotating shaft 34 is press-fitted. The rotating shaft 34 is rotatably supported by a pair of bearings 36, 36 mounted in opposite ends of the central tube 16, with a pair of stop rings 38, 38 fitted on the rotating shaft 34 to set the axial position of the rotating shaft 34 relative to the central tube 16. The rotating shaft 34 has a front (or upper) end to which a fan, not shown, of the blower is attached.

As described above, the rotor magnet 30 is composed of a plurality of circumferentially arranged permanent magnets 40 (four in the illustrated embodiment) of alternate opposite polarities. That is to say, the magnets of each pair of adjacent magnets 40 have opposite polarities. Each of the magnets 40 is disposed between an adjacent pair of a plurality of circumferentially spaced radially inward projections 41 on the yoke 28 and is bonded by an adhesive to an inner peripheral wall of the yoke 28. The yoke 28 thus provided minimizes a leak flux of the rotor magnet 30.

The permanent magnet 42 attached to a lower end of the rotating shaft 34 is magnetized in the same manner as the rotor magnet so as to enable the detection of magnetic poles corresponding in position to the position of magnetic poles of the rotor magnet 30.

With the motor 1 thus constructed, the respective windings of the exciting coil 12 of the armature 3 are alternately excited based on the position of the magnetic poles of the rotor magnet 30 of the rotor 5 so as to generate a rotating magnetic field acting on the rotor magnet 30 of the rotor 5, thereby rotating the rotor 5 and the rotating shaft 34.

Figure 3A:
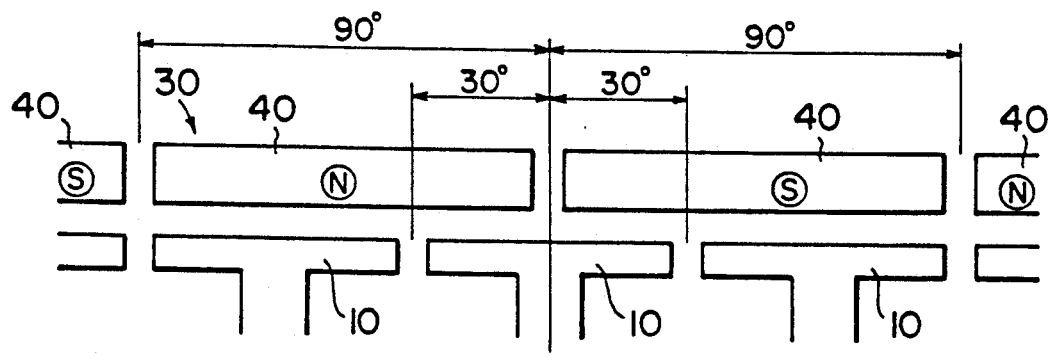
FIG. 3(a) is a development of the magnet rotor and the stator of this invention.
Figure 3B:
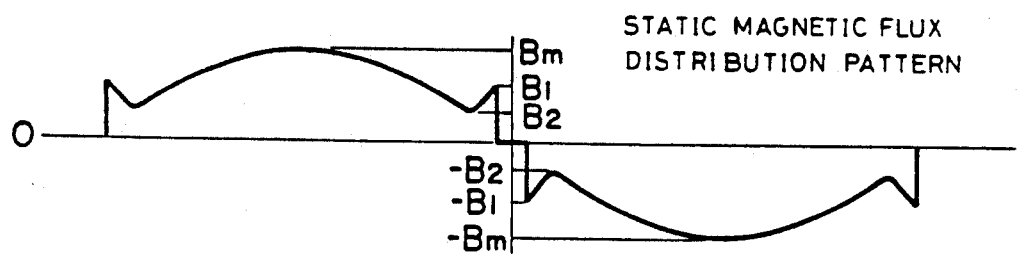
FIG. 3(b) is a graph showing a magnetic flux density distribution pattern of the rotor magnet of this invention.
Figure 3C:
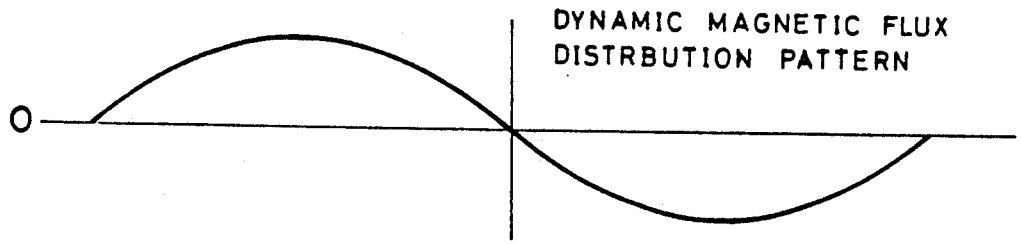
FIG. 3(c) is a graph showing an apparent magnetic flux density distribution pattern of the rotor magnet of this invention when the rotor is rotating.
Figure 4:
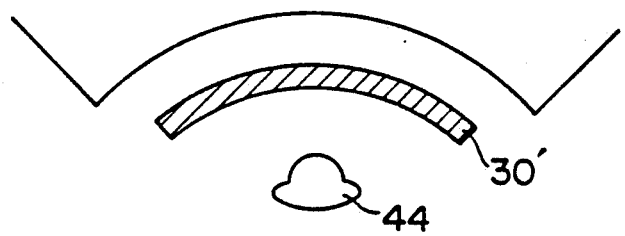
FIG. 4 is a diagrammatical view showing the manner in which the rotor magnet is magnetized.
Figure 5:
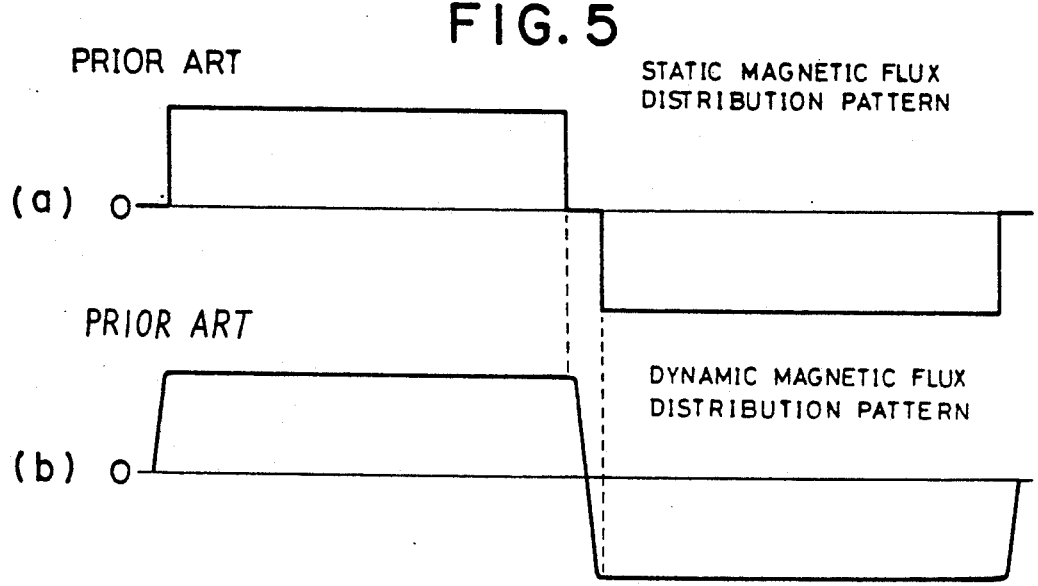
FIG. 5(a) is a graph showing a magnetic flux density distribution pattern of a first conventional rotor magnet, the pattern being a substantially rectangular waveform-like pattern.
FIG. 5(b) is a graph showing an apparent magnetic flux density distribution pattern of the first conventional rotor magnet when the motor is rotating.
Figure 6:
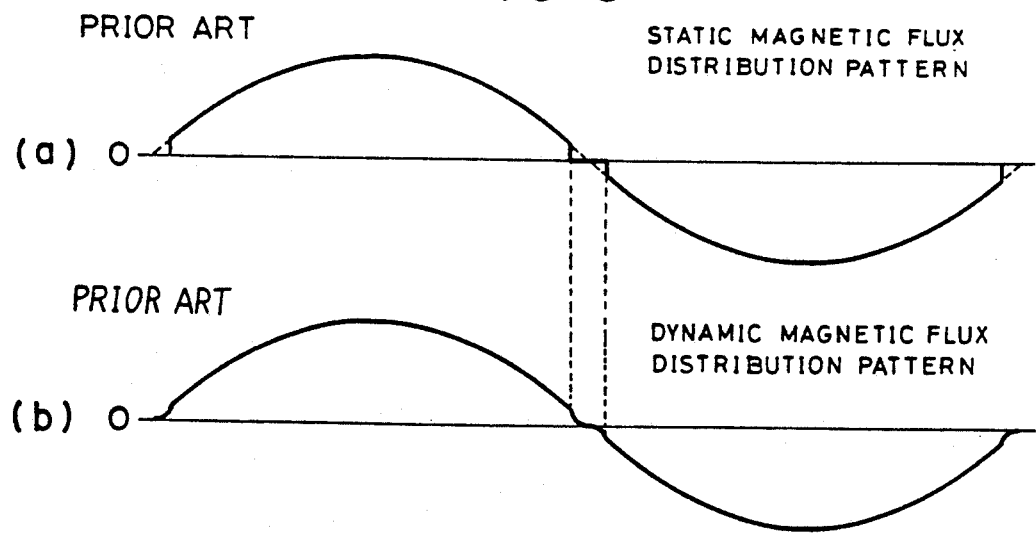
FIG. 6(a) is a graph showing a magnetic flux density distribution pattern of a second conventional rotor magnet, the pattern being a substantially sinusoidal waveform-like pattern.
FIG. 6(b) is a graph, but showing an apparent magnetic flux density distribution pattern of the second conventional rotor magnet when the rotor is rotating.

The rotor magnet 30 of the motor 1 has a novel magnetizing pattern as described below with reference to FIGS. 3(a)-(c) in which FIG. 3(a) is a development of the rotor magnet 30 and the armature 3, FIG. 3(b) is a graph showing the magnetic flux density distribution pattern of the rotor magnet 30 while the motor 1 is stopped, and FIG. 3(c) is a graph showing the magnetic flux density distribution pattern of the rotor magnet 30 when the motor 1 is rotating.

As shown in FIG. 3(b), each of the magnets 40 of the rotor magnet 30 has a maximum magnetic force (the magnetic flux density $= B_m$ or $-B_m$) at a central portion thereof, and a minimum magnetic force (the magnetic flux density $= B_2$ or $-B_2$) at a predetermined portion near each end of the magnet 40. The magnetic force at the opposite ends of each magnet 40 (the magnetic flux density $= B_1$ or $-B_1$) is slightly greater than the magnetic force at the predetermined portion ($B_1 > B_2$ or $-B_1 > -B_2$). The magnetic force changes continuously from one end of each magnet 40 to an adjacent one of the predetermined portions, thence to the central portion, thence to the opposite predetermined portion, and thence to the opposite end of the magnet 40.

In order to form the foregoing magnetic flux density distribution pattern (i.e., magnetizing pattern of the magnet 40), a ferromagnetic material 30' corresponding to each magnet 40 of the magnetic rotor 30 is disposed along a strong magnetic power source 43, and a metal body 44 is disposed on the side of the ferromagnetic material 30' which is opposite to the magnetic power source 43. The metal body 44 has a generally inverted T-shape composed of a semicircular cylindrical central portion and a pair of lateral projections integral with opposite side edges of the central portion. The metal body 44 is disposed such that the spacing or distance between the metal body 44 and the ferromagnetic material 30' is minimum at the center of an arcuate surface of the semi-cylindrical central portion, gradually increases from the center of the arcuate surface toward the opposite ends of the arcuate surface, is maximum at the opposite ends of the arcuate surface, and gradually increases from the opposite ends of the arcuate surface toward the front end of each of the lateral projections of the metal body 44. With this spacing, the strength of magnetization varies such that the magnetic flux passes densely through the central portion and the opposite end portions of the ferromagnetic material 30' and hence magnetizes these portions intensively. On the other hand, the density of the magnetic flux passing through the portions adjacent to the opposite ends of the ferromagnetic material 30' is relatively low so that these portions are magnetized weakly. The above-mentioned magnetizing pattern is thus formed.

With the magnetizing pattern thus formed, when the respective windings of the exciting coil 12 of the armature 3 are excited to rotate the motor 1, the rotor magnet 30 has an apparent magnetic flux density distribution pattern such as a smooth, distortion-free sinusoidal waveform, as shown in FIG. 3(c).

As a consequence of this sinusoidal waveform-like magnetic flux density distribution pattern, the magnetic polarity changes smoothly, so that the magnetic rotor 5 rotates smoothly without producing vibration, thus lowering the operation noise of the motor 1.

As described above, each magnet of a rotor magnet is magnetized such that the magnetic force is minimum at a predetermined portion near each end of the magnet. With this magnetization, the dynamic magnetic flux density distribution pattern becomes a continuous sinusoidal waveform-like pattern and hence enables a smooth change of the magnetic polarity which will guarantee a low noise operation of the motor.

Obviously, various modifications and variations of the present invention are possible in the light of the above teaching. It is therefore to be understood that within the scope of the appended claims the present invention may be practiced otherwise than as specifically described.

What is claimed is:

1. A motor comprising:
    a rotor having a plurality of circumferentially arranged permanent magnets of alternate opposite polarities;
    wherein each of said permanent magnets has opposite ends and a center and has a magnetic field intensity distributed in such a pattern that it is maximum at said center and gradually decreases toward said opposite ends in a circumferential direction; and
    wherein said magnetic field intensity of each of said permanent magnets is at a minimum at predetermined portions near said opposite ends and increases from said predetermined portions toward said opposite ends so that when said rotor of said motor is rotating, a magnetic induction of said permanent magnets has a continuous sinusoidal pattern.

2. A motor as recited in claim 1, further comprising a stator having an exciting coil;
    means for exciting said exciting coil of said stator; and
    wherein said rotor is fixed for rotation with a rotation shaft and has a rotor magnet confronting said stator with a predetermined gap defined therebetween.

* * * * *